April 30, 1957  B. H. VAN VACTOR  2,790,506
EXHAUST GAS CONDITIONER

Filed June 20, 1955  5 Sheets-Sheet 1

INVENTOR.
BENJAMIN H. VAN VACTOR
BY
Brown, Critchlow, Flick & Peckham
HIS ATTORNEYS

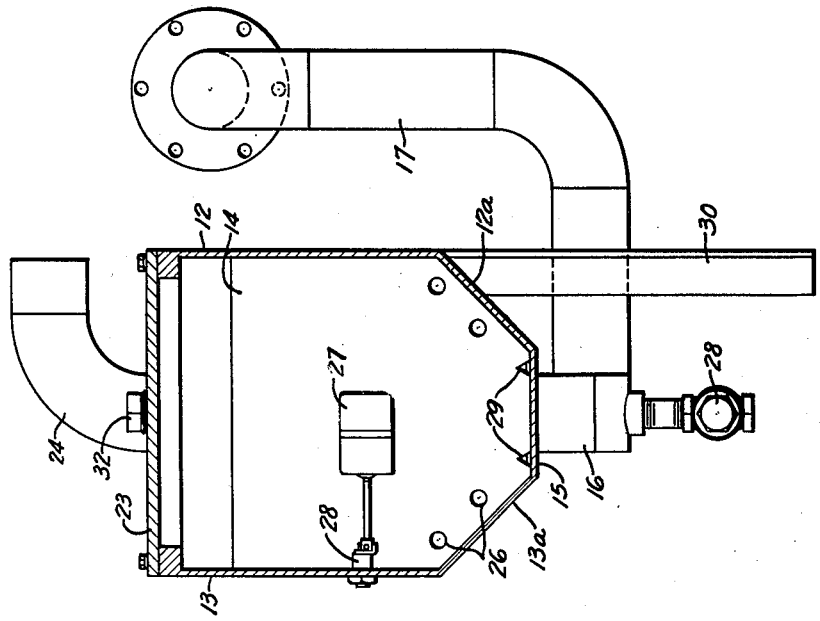
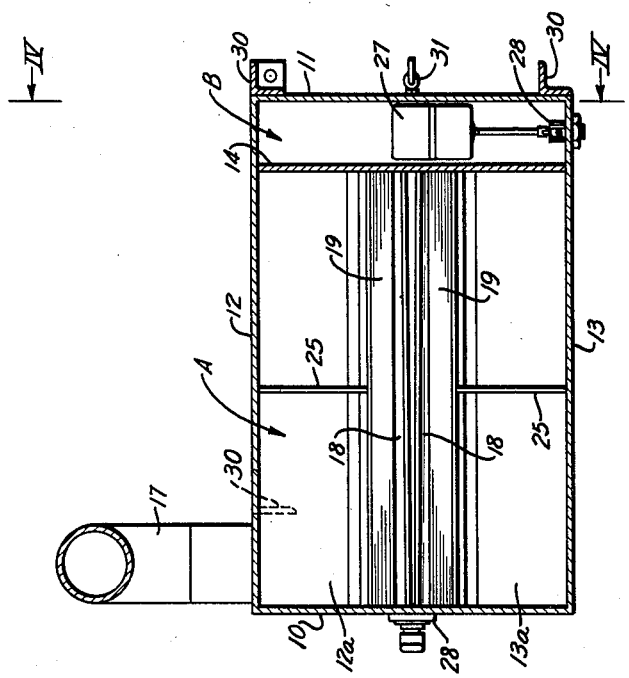

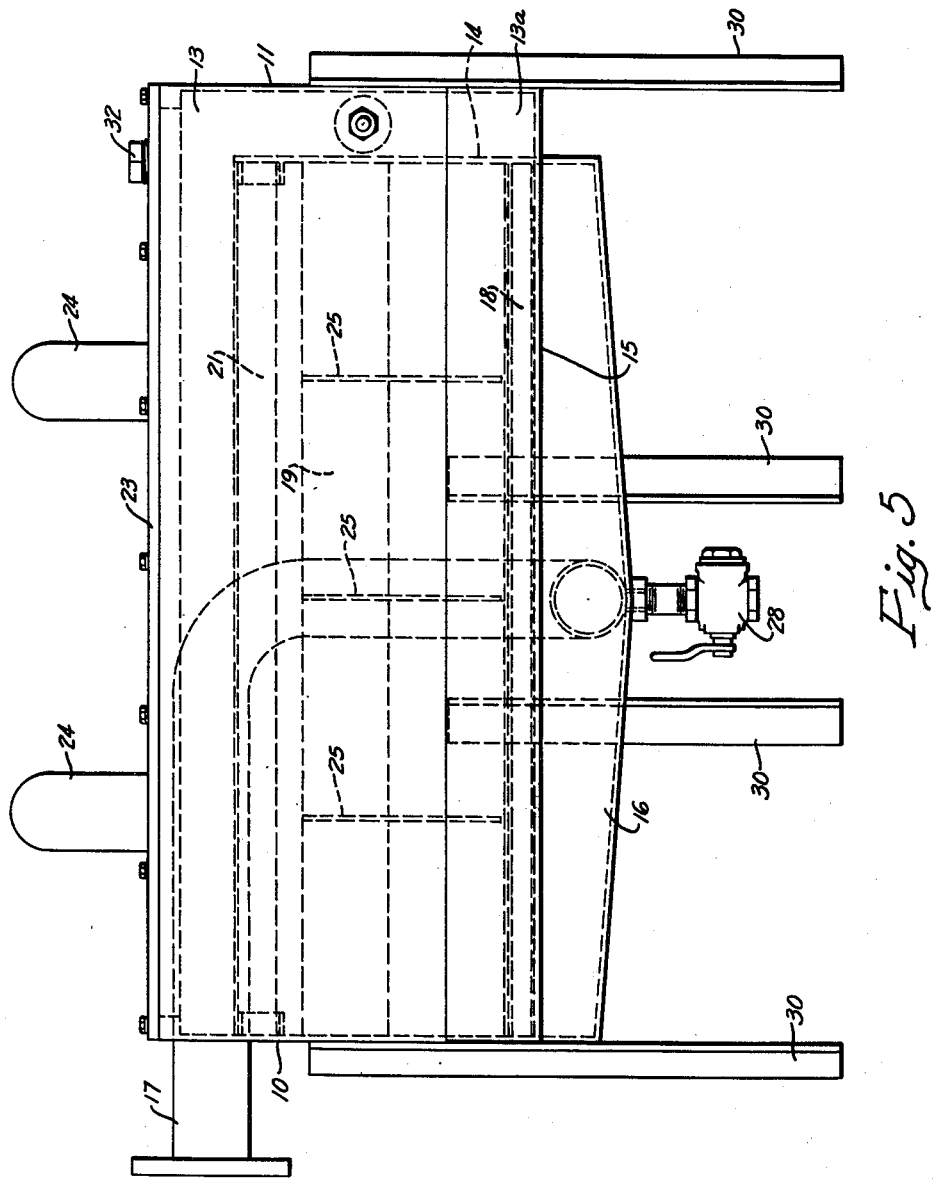

April 30, 1957   B. H. VAN VACTOR   2,790,506
EXHAUST GAS CONDITIONER
Filed June 20, 1955   5 Sheets-Sheet 4
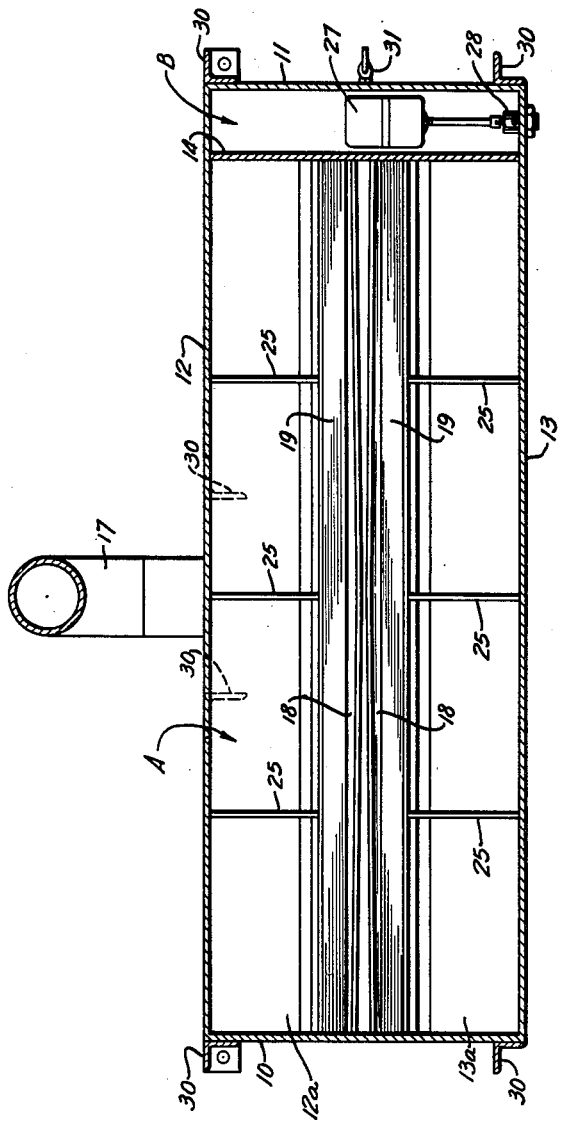
INVENTOR.
BENJAMIN H. VAN VACTOR
BY
HIS ATTORNEYS

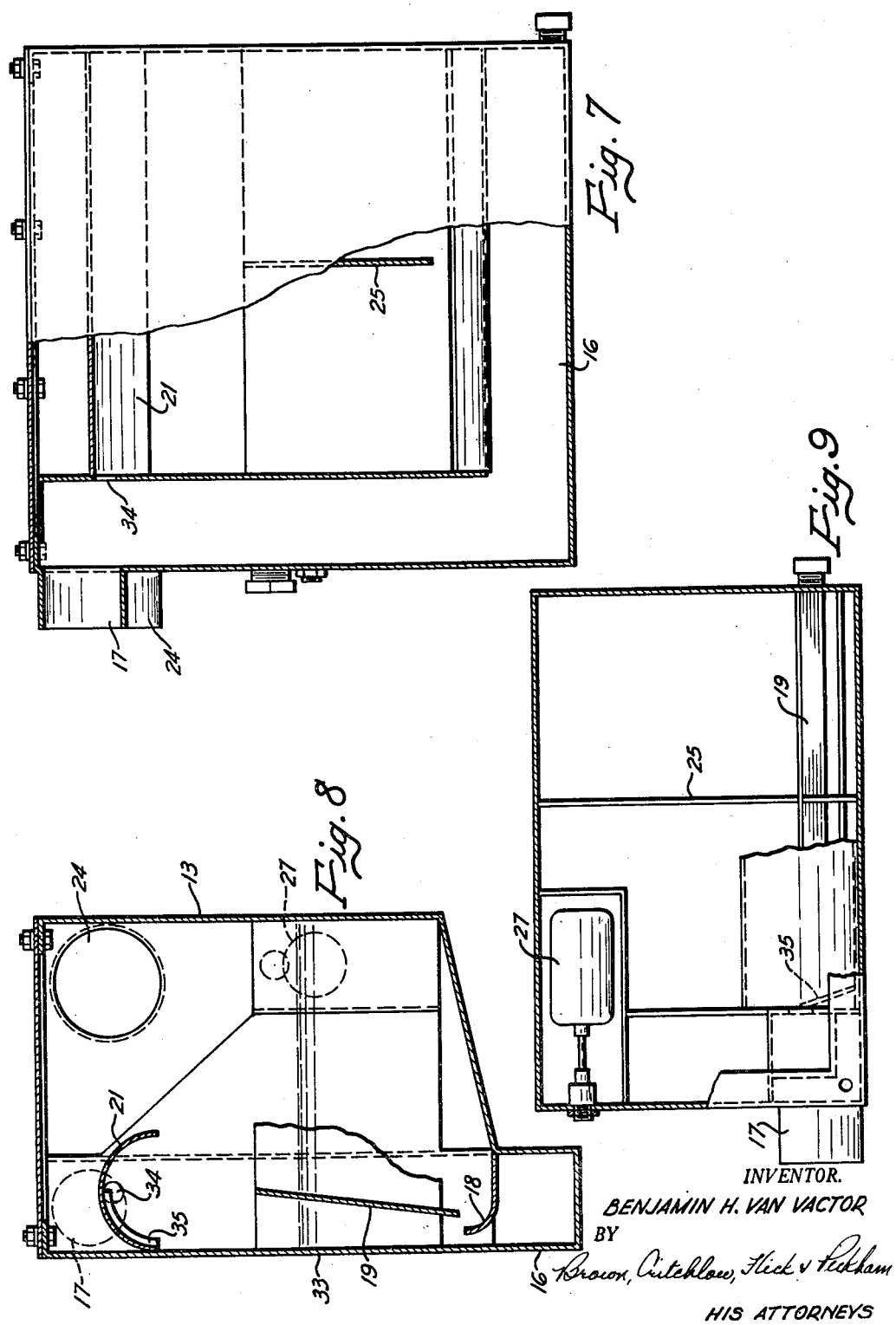

United States Patent Office 2,790,506
Patented Apr. 30, 1957

2,790,506

EXHAUST GAS CONDITIONER

Benjamin H. Van Vactor, Beckley, W. Va., assignor to National Mine Service Company, a corporation of West Virginia Application June 20, 1955, Serial No. 516,443

17 Claims. (Cl. 183—26)

This invention relates to a device which is designed to properly condition the exhaust gases of combustion engines so as to permit operation in confined spaces.

The present application is a continuation-in-part of Ser. No. 361,157 filed June 12, 1953 and which has been abandoned in favor of the present application.

The exhaust of combustion engines, particularly diesel engines, consists of hot gases that contain undesirable and noxious elements. It is a primary object of the present invention to cool down these exhaust gases to a reasonable temperature and to remove a substantial portion of the noxious elements so as to permit the operation of diesel engines in mines and other closed spaces for reasonable periods of time.

Due to the limitations of space in mines and other confined spaces an exhaust gas conditioner must be highly efficient so as to occupy a minimum of space. The present invention meets these requirements by providing for a maximum co-mingling and scrubbing of the exhaust gases with a body of water.

Another object of the invention is to provide a gas scrubbing apparatus in which after the gases have been scrubbed with water there is a thorough separation of the gases and water so that water losses are limited to the amount required for adiabatic saturation of the gases.

The device of the present invention is so arranged that the energy of the exhaust gas stream is used both for intimate mixing of the exhaust gas with the body of water and for separation of the water from the purified and cooled gas.

These and other objects of the invention will become apparent as the description proceeds.

In the drawings;

Fig. 3 is a section on line III—III of Fig. 2.

Fig. 4 is a section on line IV—IV of Fig. 3.

Fig. 5 is a side elevation of a modified form of the invention.

Fig. 6 is a longitudinal section of the device of Fig. 5.

Fig. 7 is a horizontal cross section of a modified form.

Fig. 8 is a view similar to Fig. 2, but showing the modified form of Fig. 7.

Fig. 9 is a view similar to Fig. 3, but showing the modified form of Fig. 7.

Construction

Figure 2:
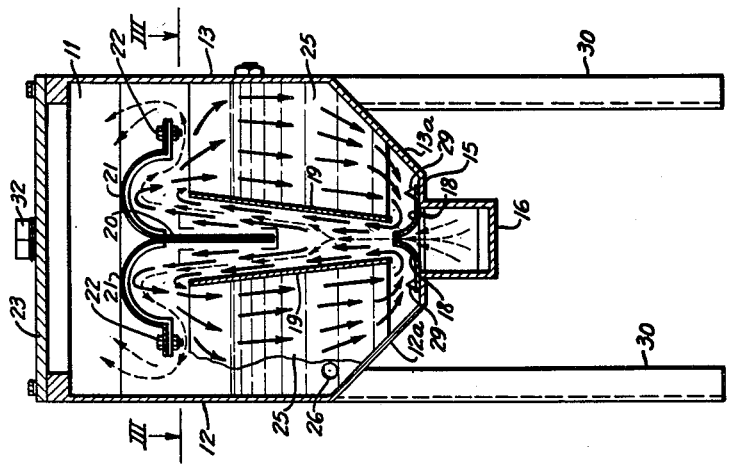
Fig. 2 is a cross section on line II—II of Fig. 1.
Figure 1:
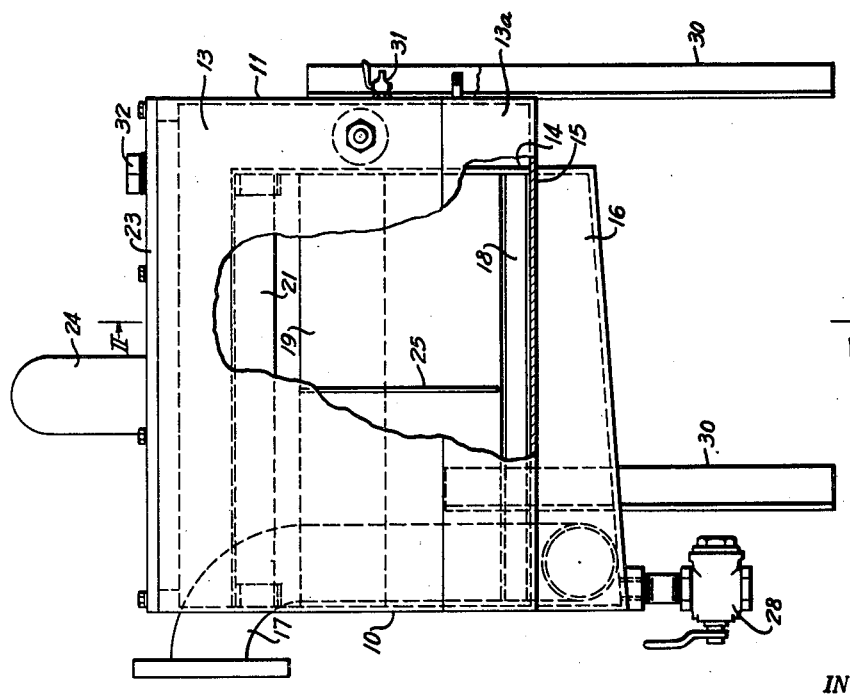
Fig. 1 is a side elevation partly in section of a preferred apparatus incorporating the invention.

A preferred embodiment of the invention, as illustrated in the drawing, comprises a box-like housing having end walls 10 and 11 and side walls 12 and 13. A partition 14 divides the housing into a reaction compartment A and a quiescent compartment B (see particularly Fig. 3).

The lower end of the side walls 12 and 13 merge into inwardly sloping portions 12a and 13a, respectively, which connect with the bottom wall 15. A distribution manifold 16 is connected to the bottom wall 15, and is formed with a distribution slot which delivers the gas into the reaction compartment A. The distribution manifold 16 is tapered in depth being deepest at the forward end which receives the hot gases and being of less depth at the end adjacent partition 14. An inlet manifold 17 communicates with the forward end of the distribution manifold 16 and has a vertically extending portion which extends above the normal level of water in the exhaust gas conditioner and is formed to be attached to the exhaust manifold of the engine.

A pair of Venturi plates 18 are secured to the bottom wall 15 and have their inner edges bent upwardly and spaced from each other so as to produce a slot in the form of a Venturi-like opening above the center of the distribution manifold 16. This Venturi-like slot is tapered in width being narrower at the end adjacent the inlet manifold 17 and becoming wider toward the rear partition 14.

A vertical reactor stack is formed by two reactor plates 19 which have their forward ends secured to front wall 10 and their rearward ends secured to the partition 14. These reactor plates have their lower ends spaced upwardly from the bottom wall 15 and their upper edges project above the normal water level as shown in Fig. 2. The lower edges of the reactor plates 19 are spaced from each other a greater distance than the width of the Venturi opening at its widest part and these plates are wider apart at their upper edges than at the lower edges, thus forming an upwardly expanding reactor stack the full length of the reaction compartment A.

The upward movement of the co-mingled gas and water in the upper part of the vertical reactor stack is guided by a reaction member which includes a central divider vane 20 and two laterally extending curved deflector vanes 21. The central divider vane 20 extends downwardly a considerable distance between the reactor plates 19, and the upper edge of the central divider vane 20 extends above the upper edges of the reactor plates 19. Each of the curved deflector vanes 21 has its inner edge connected to the upper edge of the central divider vane 20 and extends upwardly and outwardly in an arc which ends outwardly of the upper edge of the reactor plate 19 but spaced a considerable distance inwardly from the side wall. The reaction member extends the full length of the reaction compartment A and has its forward edge secured to wall 10 and its rear edge secured to partition 14 in any suitable manner, as by bolts 22.

The top of the body is closed by a tightly fitting cover plate 23 and an outlet manifold 24 carries off the treated exhaust gases.

Operation

At this point it is convenient to explain the operations that take place in the reaction compartment A. Before the engine is started the exhaust gas conditioner is filled with water through the filler cap 32 to the desired level, which is above the inspection cock 31. The water will naturally settle into the distribution manifold 16 and will rise in the inlet manifold 17 to a level corresponding to the level in the reaction compartment.

When the engine is started the exhaust gases entering the inlet manifold 17 will displace most of the water from the inlet manifold and from the distribution manifold 16, forcing the water into the space above the Venturi-like slot.

It is desirable to have the exhaust gas pass upwardly through the Venturi opening at a uniform velocity over its entire length and this is accomplished first by forming the distribution manifold 16 so that it can accommodate a greater volume of gas near the inlet end and a smaller volume near the rear end adjacent partition 14. Conversely the Venturi-like slot is narrower at the forward end where the gas pressure tends to be greater and is wider at the rear end where the gas pressure is normally less. This combination tends to equalize the upward velocity of the gas throughout the entire length of the Venturi-like slot.

As the gas rushes upwardly through the Venturi-like slot it tends to carry water along with it upwardly into the vertical reactor stack. Upward movement of the gas is facilitated by the fact that as it becomes aerated it becomes lighter and hence moves upwardly. As the gas and entrained water move upwardly in the vertical reactor stack the central divider vane 20 straightens out any turbulence present and divides the upward flowing column of gas and water equally, causing equal volumes to impinge on the two curved deflector vanes 21.

In Fig. 2 the movement of the gas is indicated diagrammatically by the dotted arrows and the movement of the water is indicated diagrammatically by the heavy solid arrows. By the time the co-mingled gas and water reach the top of the vertical reactor stack they are very thoroughly mixed and impinge at high velocity upon the curved deflector vanes 21, which bend the stream outwardly and downwardly. The water leaves the outer edges of the curved deflector vanes 21 in the form of a sheet or curtain of water directed downwardly toward the main body of water in the reaction compartment A. The gas, being lighter than water, is less affected by this downward velocity and separates from the water to escape into the low pressure area above the reaction member and thence escapes through the outlet manifold 24. The water, being heavier, continues downwardly and impinges upon the surface of the main body of water, thus helping to force the water downwardly around the lower ends of the reactor plates 19 to cause a continuous circulation of the water.

The sloping walls 12a and 13a assist in this continuous circulation of water, although these sloping sides are not essential to the invention.

It has been found that for maximum efficiency certain spacial relationships must be maintained. Thus the outer edges of the curved deflector vanes 21 must be spaced sufficiently high above the water level and sufficiently far in from the side walls to provide adequate escape space for the gas. It has been found that for maximum efficiency each of the reactor plates 19 should point at the center of curvature of its associated curved deflector vane 21.

It will be seen from the above explanation that the energy of the exhaust gas rushing upwardly through the Venturi-like slot causes intimate mixing of the gas and water in the vertical reactor stack and carries the combined gas and water against the curved deflector vanes at a high velocity, thereby throwing the water downwardly and permitting the gas to escape upwardly.

*Other features of construction*

The exhaust gas conditioner of the present invention may be mounted on a moving vehicle and in order to prevent surging of the water in the reaction compartment A, baffle plates 25 may be provided. These baffle plates extend the full height of the reactor plates 19 and are fitted between the reactor plates and the outer wall of the housing.

To replace water removed from the reaction compartment A during the operation of the device, means is provided to maintain a constant water level in the reaction compartment. For this purpose openings 26 formed in partition 14 admit water from the quiescent compartment B, where a suitable float 27 controls an inlet valve 28.

It is preferred to drain the water from the exhaust gas conditioner when the engine is stopped at the end of a day's operation. For this purpose a drain valve 28a is placed at the low point of the distribution manifold 16. Notches 29 at the bottom of partition 14 permit drainage of the water from the quiescent compartment B.

The device may be supported in any suitable manner as by the legs 30.

*Modifications*

Figs. 5 and 6 illustrate a modification of the invention by which it is possible to double the capacity of the exhaust gas conditioner by merely lengthening it without changing its height. Such an arrangement is particularly useful for mine locomotives where it is necessary to keep the height of the locomotive at a minimum.

In the form of Figs. 5 and 6 the quiescent chamber B is of the same size as that used in the form of Figs. 1 to 4, but the reaction chamber A is twice as long as the reaction chamber used in Figs. 1 to 4. In this case the inlet manifold 17 connects with the distribution manifold 16 near the center of the device, and the distribution manifold 16 tapers down in cross sectional area toward both ends. The Venturi-like slot between plates 18 is narrowest adjacent the inlet manifold 17, and widens out toward the opposite ends.

The operation of the device of Figs. 5 and 6 is the same as that described above in connection with Figs. 1 to 4.

Another modification is illustrated in Figs. 7, 8 and 9. This modification is similar to the form illustrated in Figs. 1 to 4 inclusive but includes only one lateral half of the device of Figs. 1 to 4. In other words, the device of Figs. 7, 8 and 9 is formed by cutting the device of Figs. 1 to 4 in half on a vertical section line located in the middle of Fig. 2, thus producing a device which has half the width of Fig. 2, and has only a single reactor plate 19 and curved deflector vane 21.

Thus it will be seen that the side wall 33 of Fig. 8 is located in the plane occupied in Fig. 2 by the central divider vane 20. The reactor plate 19 of Fig. 8 cooperates with the side wall 33 in the same way that the reactor plate 19 of Fig. 2 cooperates with the central divider vane 20 to form a vertical reactor stack. The curved deflector vane 21 of Fig. 8 serves the same purpose of the deflector vane of Fig. 2.

The float 27 shown in Fig. 9 is located in a quiescent compartment and maintains in the exhaust gas conditioner a water level as indicated in Fig. 8. A baffle plate 25 prevents surging of the water bath.

The hot exhaust gas enters through the inlet manifold 17, which communicates with the distribution manifold 16. The gas escapes upwardly from the distribution manifold 16 past the Venturi plate 18 into the reactor stack and leaves the conditioner by way of the outlet manifold 24.

In general, it will be understood that the modification of Figs. 7, 8 and 9 operates in exactly the same way as the device of Figs. 1 to 4 inclusive but with a reduced capacity for handling gas. In this modification the inlet and exhaust manifolds are located at the same end of the conditioner unit, but it will be understood that these manifolds may be placed in any convenient location.

An additional feature illustrated in connection with Figs. 7, 8 and 9 is the provision of the by-pass port 34 which connects the upper end of the reactor stack with the inlet manifold 17. This by-pass port serves to equalize the pressure between the inlet and outlet portions of the flow circuit so that water cannot be drawn back toward the engine, after it is shut down, as the result of cooling and contraction of the gases that would otherwise be trapped in the pipe between the engine and the conditioner. The relatively small percentage of the gases that are allowed to by-pass the main water bath through this port are thoroughly saturated and scrubbed by the water curtain flowing under the curved reactor vane presently to be described. This by-pass port also serves to prevent water from being pulled back into the engine in the event it should stall and be allowed to rotate in reverse direction momentarily as it might do on a steep grade.

A water diversion vane 35 is so arranged as to divert some of the water passing under the curved deflector vane 21 through the by-pass port 34 and into the inlet manifold 17. The small amount of water spray thus introduced into the inlet manifold contacts the hot exhaust gases and reduces their temperature and volume before they reach the distribution slot formed by Venturi plate 18. This preliminary reduction in volume of the exhaust gases makes it possible to reduce the area of the distribution slot and consequently reduce the overall size of the conditioner.

The operation of the exhaust gas conditioner described above causes such a thorough intermingling of the gas and water over a sufficiently long time that the gas becomes adiabatically saturated. This means that a small part of the heat in the exhaust gas is absorbed by the water thereby raising the temperature of the water. However, the major portion of the heat in the gas is absorbed by vaporization of water. At atmospheric pressure the temperature of the water and gases leaving the exhaust gas conditioner will attain a maximum temperature of 160° F. In other words, the rate of vaporization of water at 160° F. is sufficient to absorb all of the heat from the gas and the temperature of the water becomes stabilized at 160° F. Hence the exhaust gases, which may leave a diesel engine at a temperature as high as 1300° F., are cooled to a final temperature not exceeding 160° F.

The operation of the device in separating the water and gas is so efficient that substantially the only water lost from the conditioner is that which is vaporized in absorbing heat from the gas. Therefore, the device can be operated over a normal eight hour shift with the addition of relatively small amounts of water.

The exhaust gas conditioner is designed in such a size as to function effectively at the maximum speed and load of the particular engine. Any lesser speed or load of the engine results in the production of a reduced volume of exhaust gas, hence lower velocities in the conditioner. In other words, the characteristics of the conditioner are self-compensating for engine load and speed, and hence equally good performance is obtained at all speeds and loads.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An exhaust gas conditioner comprising: an elongated reaction compartment designed to be filled with water to a certain level, and having side walls and a bottom wall, a pair of reactor plates extending lengthwise of the reaction compartment and spaced from each other, the bottom edges of the plates extending to a point near to, but spaced from, the bottom wall of the compartment, the top edges of the plates extending to a point slightly above the water level being spaced from each other a greater distance than the bottom edges of the plate to provide a vertically expanding reactor stack, a distribution manifold for admitting exhaust gases to the bottom of the reactor stack, said manifold being provided with a distribution slot, and a reaction member located above the reactor stack, the reaction member including a central divider vane which projects downwardly between the reactor plates, and a pair of curved deflector vanes, each reactor vane extending outwardly from the divider vane and having a concave surface located above and spaced from the upper edge of a reactor plate.

2. A device as specified in claim 1 in which means is provided to maintain the water level in the reaction compartment.

3. A device as specified in claim 1 in which an opening for admitting exhaust gas is located at one end of the distribution manifold, and the distribution manifold reduces in cross-sectional area from the inlet opening toward the opposite end of the manifold.

4. A device as specified in claim 1 in which each of the reactor plates points toward the center of curvature of a reactor vane.

5. A device as specified in claim 1 in which the distribution slot is formed by opposite curved surfaces which form a venturi-like opening.

6. An exhaust gas conditioner comprising: an elongated reaction compartment designed to be filled with water to a certain level, and having side walls and a bottom wall, a pair of reactor plates extending lengthwise of the reactor compartment and spaced from each other to provide a vertical reactor stack, the bottom edges of the plates extending to a point near to, but spaced from, the bottom wall of the compartment, the top edge of the plates extending to a point slightly above the water level, a distribution manifold for admitting exhaust gases to the bottom end of the reactor stack, the manifold being formed with an inlet opening for receiving exhaust gases, and with a distribution slot, the distribution slot being tapered in width, being narrowest at the inlet opening and becoming wider away from the inlet opening, a reaction member located above the reactor stack, the reaction member including a central divider vane which projects downwardly between the reactor plates, the reaction member also including a pair of curved reactor vanes, each reactor vane extending outwardly from the divider vane and having a concave surface located above and spaced from the upper edge of a reactor plate, the reactor plates being disposed so that each of them points toward the center of curvature of a reactor vane.

7. A device as specified in claim 6 in which means is provided to maintain the water level in the reaction compartment.

8. A device as specified in claim 6 in which the distribution slot is formed by opposite curved surfaces which form a venturi-like opening.

9. An exhaust gas conditioner comprising: a rectangular housing having end walls, side walls and a bottom wall, a partition extending between the side walls and dividing the housing into a reaction compartment and a quiescent compartment, the reaction and quiescent compartments being designed to be filled with water to a common level, the partition being formed with apertures near its bottom which permit the water level in the compartments to be equalized, a pair of reactor plates extending lengthwise of the reactor compartment, having their lower edges spaced from the bottom of the reactor compartment and forming a vertical reactor stack in which the gas is intimately mixed with water as the gas passes upwardly in the reactor stack, a distribution manifold connected to the bottom wall of the housing and formed with a distribution slot which admits gas to the bottom of the reactor stack, a reaction member located above and extending the full length of the reactor stack, the reaction member including a central divider vane and a pair of curved reactor vanes, each reactor vane extending outwardly from the divider vane and having a concave surface located above and spaced from the upper edge of a reactor plate, the reactor vanes serving to separate the gas and water by directing the water downwardly, and a float-operated water supply valve located in the quiescent compartment.

10. A device as specified in claim 9 in which each of the reactor plates points toward the center of curvature of a reactor vane.

11. A device as specified in claim 9 in which the reactor stack expands upwardly.

12. A device as specified in claim 9 in which the distribution slot is formed by opposite curved surfaces which form a venturi-like opening.

13. An exhaust gas conditioner comprising: an elongated reaction compartment designed to be filled with water to a certain level, a vertical plate member and at least one reactor plate, the reactor plate being located within the reaction compartment, and having its lower end located near and spaced from the bottom of the reaction compartment and close to the vertical plane of the vertical plate, and having its upper end at a point above the water level in the reaction compartment and spaced farther away from the vertical plane of the vertical plate than the lower end of the reactor plate, so that both sides of the reactor plate are in contact with the pool of water in the reaction chamber, the reactor plate co-operating with the vertical plate to form a reactor stack which expands upwardly, a gas inlet manifold extending parallel to the reactor plate, the inlet manifold being provided with a slot which extends through the bottom of the reaction compartment and opens into the lower end of the reactor stack below the water level in the reaction compartment, and which delivers hot gas to the bottom of the reactor stack, and a deflector vane extending from the vertical plate member above and over the reactor plate, and crossing the axis of the reactor plate the deflector vane being spaced from the upper end of the reactor plate, and being concave in shape, whereby the mixture of gas and water passing upwardly through the reactor stack is turned and directed downwardly toward the surface of the water within the reaction compartment.

14. A device as specified in claim 13 in which the deflector vane is half-cylindrical in shape.

15. A device as specified in claim 13 in which the slot in the inlet manifold is narrower than the opening at the bottom of the reactor stack.

16. A device as specified in claim 13 in which there is provided a port opening from the gas inlet manifold into the reaction chamber under the curved deflector vane.

17. A device as specified in claim 16 in which a diversion plate is attached to the underside of the curved deflector vane to direct water from the reactor stack through the port in the gas inlet manifold.

References Cited in the file of this patent

UNITED STATES PATENTS

| | | |
|---|---|---|
| 1,404,998 | Pappanikolaou | Jan. 31, 1922 |
| 2,015,367 | Richard | Sept. 24, 1935 |
| 2,301,601 | Wittwer et al. | Nov. 10, 1942 |
| 2,457,605 | Sebold | Dec. 28, 1948 |
| 2,536,998 | Newcomb et al. | Jan. 2, 1951 |
| 2,546,259 | Fenn | Mar. 27, 1951 |